(12) United States Patent
Serafin

(10) Patent No.: US 12,181,613 B2
(45) Date of Patent: Dec. 31, 2024

(54) SYSTEM AND METHOD FOR ADJUSTING BOUNDING BOX DIMENSIONS

(71) Applicant: Toyota Research Institute, Inc., Los Altos, CA (US)

(72) Inventor: Jacopo Serafin, Los Altos, CA (US)

(73) Assignees: Toyota Research Institute, Inc., Los Altos, CA (US); Toyota Jidosha Kabushiki Kaisha, Toyota (JP)

(*) Notice: Subject to any disclaimer, the term of this patent is extended or adjusted under 35 U.S.C. 154(b) by 400 days.

(21) Appl. No.: 17/731,790

(22) Filed: Apr. 28, 2022

(65) Prior Publication Data

US 2023/0350034 A1 Nov. 2, 2023

(51) Int. Cl.
*G01S 17/89* (2020.01)
*G01S 7/497* (2006.01)
*G01S 17/42* (2006.01)
*G01S 17/86* (2020.01)

(52) U.S. Cl.
CPC ............ *G01S 7/497* (2013.01); *G01S 17/42* (2013.01); *G01S 17/86* (2020.01); *G01S 17/89* (2013.01)

(58) Field of Classification Search
CPC ........ G01S 17/931; G01S 17/86; G01S 17/42; G01S 17/89; G01S 7/497
See application file for complete search history.

(56) References Cited

U.S. PATENT DOCUMENTS

| | | |
|---|---|---|
| 10,304,191 B1 | 5/2019 | Mousavian et al. |
| 10,891,518 B1 * | 1/2021 | Joshi .................. G06N 20/20 |
| 2012/0063578 A1 * | 3/2012 | Weng .................. H04M 1/2535 379/110.01 |
| 2017/0220876 A1 * | 8/2017 | Gao ........................ G06V 10/82 |
| 2017/0280125 A1 * | 9/2017 | Brown ..................... B65G 1/00 |
| 2019/0096086 A1 * | 3/2019 | Xu ........................ G06V 20/647 |
| 2020/0082560 A1 * | 3/2020 | Nezhadarya ............ G06T 17/10 |
| 2020/0151512 A1 * | 5/2020 | Corral-Soto .......... G06F 18/217 |
| 2021/0063578 A1 * | 3/2021 | Wekel .................. G01S 17/894 |
| 2021/0397855 A1 * | 12/2021 | Guizilini ................... G06T 7/50 |
| 2021/0403050 A1 * | 12/2021 | Gan ................. B60W 60/0027 |
| 2022/0012466 A1 * | 1/2022 | Taghavi .................... G06T 7/73 |

OTHER PUBLICATIONS

Ahmad El Sallab et al. "YOLO4D: A Spatio-temporal Approach for Real-time Multi-object Detection and Classification from LiDar Point Clouds." 32nd Conference on Neural Information Processing Systems. 2018.

Waleed Ali et al. "YOLO3D: End-to-end real-time 3D Oriented Object Bounding Box Detection from LiDAR Point Cloud." Proceedings of the European Conference on Computer Vision Workshops, 2018.

Q. Gao et al. "Minimum elastic bounding box algorithm for dimension detection of 3D objects: a case of airline baggage measurement." IET Image Processing 12, No. 8 (2018): 1313-1321.

* cited by examiner

*Primary Examiner* — Sang H Nguyen

(74) *Attorney, Agent, or Firm* — Christopher G. Darrow; Darrow Mustafa PC

(57) ABSTRACT

Systems and methods for adjusting the dimensions of point clouds are described herein. In one example, a system includes a processor and a memory having instructions that, when executed by the processor, cause the processor to generate a bounding box using a point cloud generated by a sensor and adjust a dimension of the bounding box based on a magnitude of a viewing angle of a side of the bounding box with respect to the sensor.

17 Claims, 7 Drawing Sheets

SYSTEM AND METHOD FOR ADJUSTING BOUNDING BOX DIMENSIONS

TECHNICAL FIELD

The subject matter described herein relates, in general, to systems and methods for adjusting the dimensions of bounding boxes generated from point clouds.

BACKGROUND

The background description provided is to present the context of the disclosure generally. Work of the inventor, to the extent it may be described in this background section, and aspects of the description that may not otherwise qualify as prior art at the time of filing are neither expressly nor impliedly admitted as prior art against the present technology.

Some current devices, such as vehicles, have sensors that collect data and provide this data to object detection systems. In turn, these object detection systems output bounding boxes of objects detected within the collected data that generally outline the objects. As it is well known, bounding boxes are typically utilized in object detection and may be either two-dimensional or three-dimensional and are generally in the shape of a rectangle or rectangular prism, respectively. In some cases, bounding boxes specify the position of the object, object class, and/or a confidence interval indicating how likely the object is at the location indicated by the bounding box.

As mentioned before, bounding boxes generally outline the detected object. The dimensions regarding the bounding boxes are based on the collected data. However, depending on the point of view of the sensor with regard to the object, the dimensions of the bounding box as output by the object detection system can vary such that they are either too large or too small.

SUMMARY

This section generally summarizes the disclosure and is not a comprehensive explanation of its full scope or all its features.

In one embodiment, a system for adjusting the dimensions of a bounding box includes a processor and a memory in communication with the processor. The memory includes an adjustment module having instructions that, when executed by the processor, cause the processor to generate a bounding box using a point cloud generated by a sensor and adjust a dimension of the bounding box based on a magnitude of a viewing angle of a side of the bounding box with respect to the sensor.

In another embodiment, a method for adjusting the dimensions of a bounding box include the steps of generating a bounding box using a point cloud generated by a sensor and adjusting a dimension of the bounding box based on a magnitude of a viewing angle of a side of the bounding box with respect to the sensor.

In yet another embodiment, a non-transitory computer-readable medium stores instructions that, when executed by a processor, cause the processor to generate a bounding box using a point cloud generated by a sensor and adjust a dimension of the bounding box based on a magnitude of a viewing angle of a side of the bounding box with respect to the sensor Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods for adjusting one or more dimensions of a bounding box output by a detector. In prior art solutions, a detector receives a point cloud that may be generated by a light detection and ranging (LIDAR) sensor and/or a pseudo-LIDAR point cloud generated from one or more images captured by cameras. Based on these point clouds, the detector typically outputs one or more bounding boxes indicating the presence of objects. Bounding boxes generally outline the detected object and may be in the shape of a rectangle or rectangular prism. In some cases, bounding boxes specify the position of the object, object class, and/or a confidence interval indicating how likely the object is at the location indicated by the bounding box.

However, the current technology sometimes generates bounding boxes having dimensions that do not accurately outline the detected object. Further still, as additional frames of sensor information are collected, a bounding box may appear to rapidly change dimensions in each detection, causing it to "wobble." These uncertainties regarding the bounding box dimensions may negatively impact downstream processes, such as path planning.

The systems and methods described herein can adjust one or more dimensions of a bounding box output by a detector by considering the sensor's viewing angle with respect to the bounding box. In particular, the sensor that provided the information used to generate the point cloud, which, in turn, was utilized to generate the bounding box, has a viewing angle with respect to one or more sides of the generated bounding box. Based on the magnitude of the viewing angle, the systems and methods described herein adjust one or more dimensions of the bounding box to align with the actual dimensions of the detected object more closely.

The systems and methods for adjusting a bounding box can be incorporated into any one of several different devices and/or structures and can have a variety of applications. One such application incorporates the bounding box adjustment system in a vehicle that can detect objects for safety and/or path planning purposes. Again, it should be understood that the bounding box adjustment system described should not be limited to one particular use, such as a vehicle.

Figure 1:
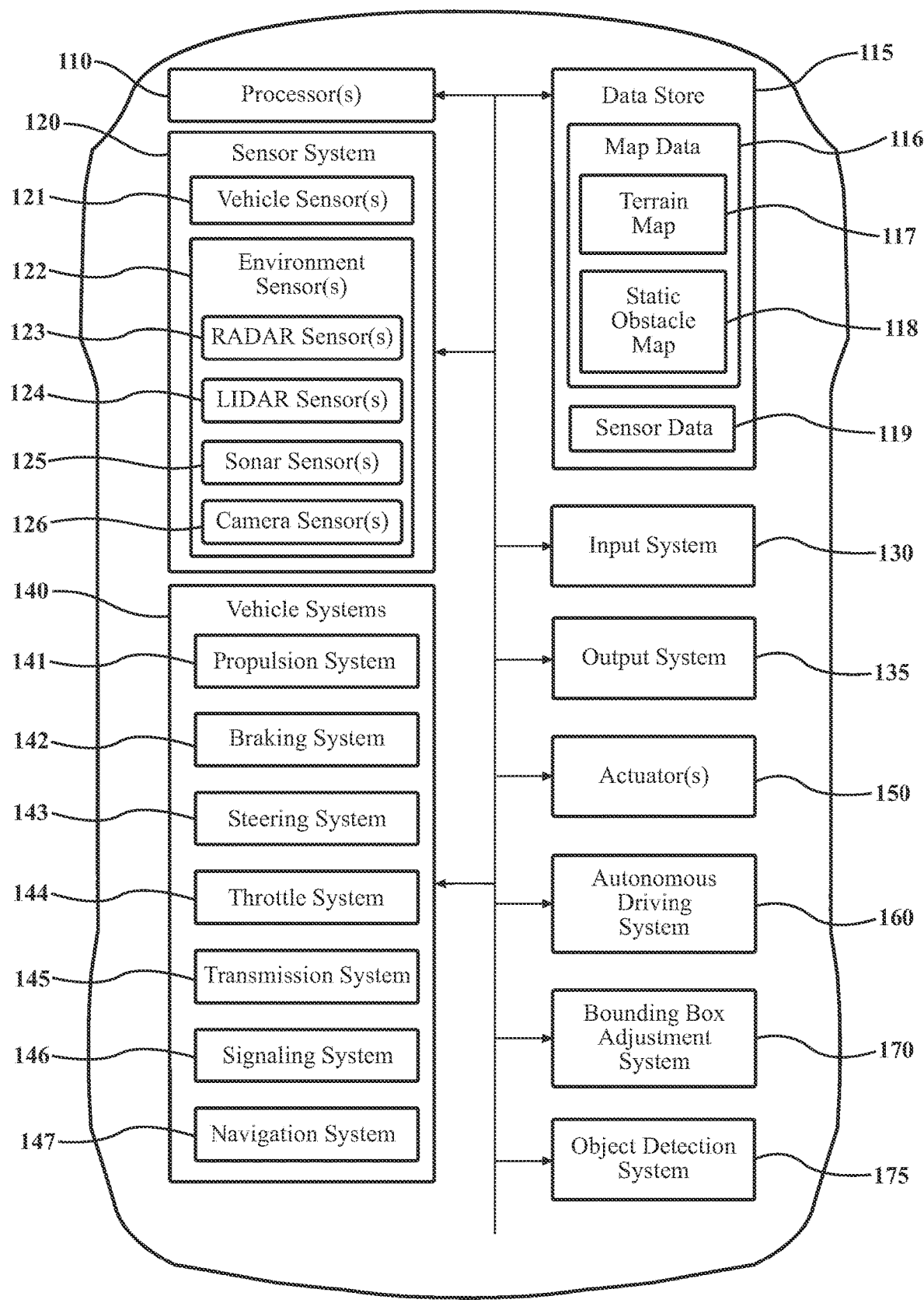
FIG. 1 illustrates a vehicle incorporating a bounding box adjustment system.

With this understanding, referring to FIG. 1, an example of a vehicle 100 is illustrated. As used herein, a "vehicle" is any form of powered transport. In one or more implementations, the vehicle 100 is an automobile. In some implementations, the vehicle 100 may be any robotic device or form of powered transport that, for example, includes one or more automated or autonomous systems, and thus benefits from the functionality discussed herein.

The automated/autonomous systems or combination of systems may vary in different embodiments. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a bounding box adjustment system 170. The bounding box adjustment system 170 may be incorporated within the autonomous driving system 160 or may be separate, as shown. Briefly, the bounding box adjustment system 170 may receive a point cloud and generates one or more bounding boxes of objects detected in the point cloud. In addition, the bounding box adjustment system 170 adjusts one or more dimensions of the bounding boxes based on a viewing angle of the sensor with respect to one or more sides of the bounding box. Generally, the greater the viewing angle, and therefore the better the view the sensor had of the object represented by the bounding box, the greater the adjustment of the dimension of the bounding box.

Figure 2:
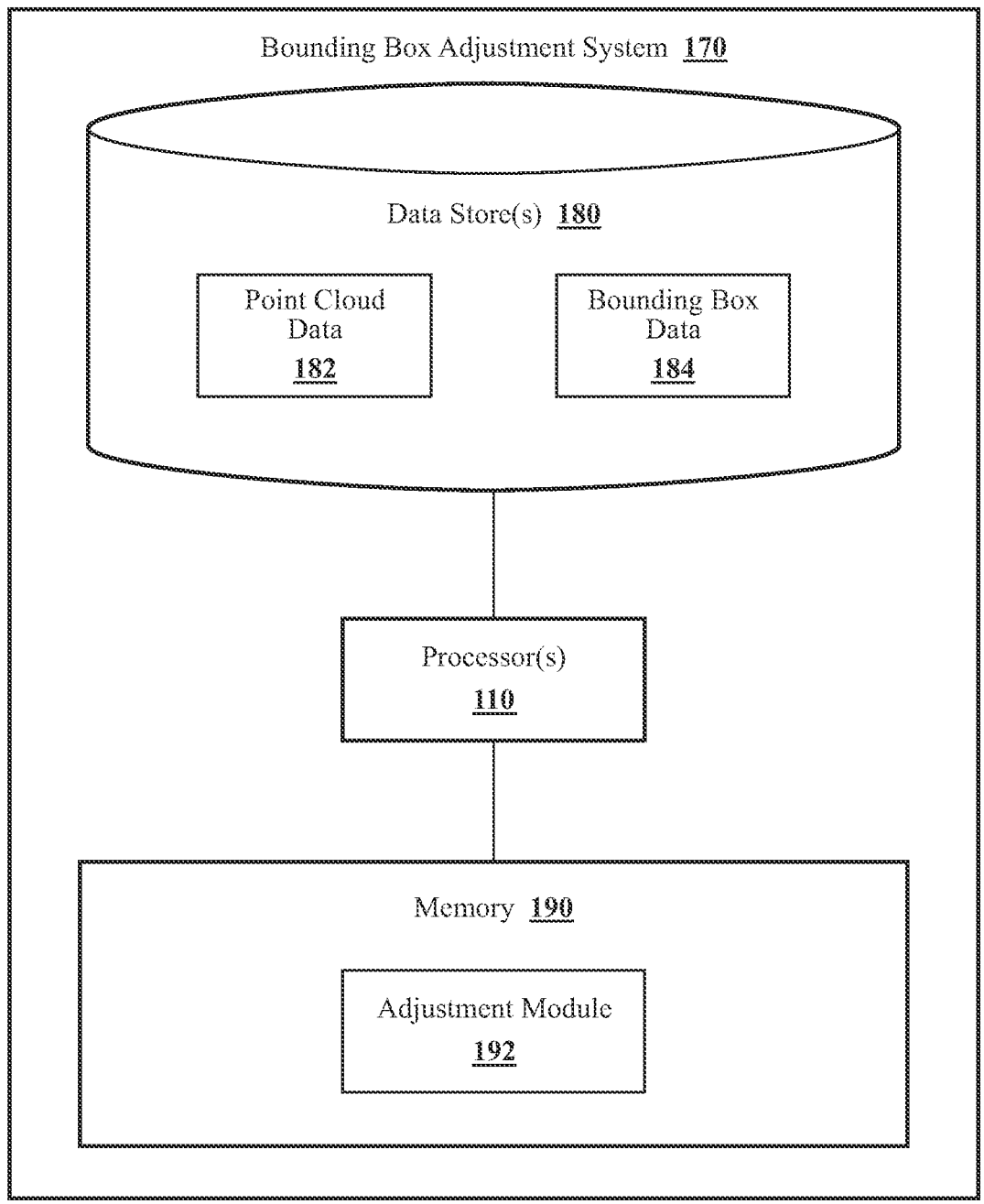
FIG. 2 illustrates a more detailed view of the bounding box adjustment system of FIG. 1.

With reference to FIG. 2, one embodiment of the bounding box adjustment system 170 is further illustrated. As shown, the bounding box adjustment system 170 includes one or more processor(s) 110. Accordingly, the processor(s) 110 may be a part of the bounding box adjustment system 170 or the bounding box adjustment system 170 may access the processor(s) 110 through a data bus or another communication path. In one or more embodiments, the processor(s) 110 is an application-specific integrated circuit that is configured to implement functions associated with an adjustment module 192. In general, the processor(s) 110 is an electronic processor such as a microprocessor that is capable of performing various functions as described herein.

In one embodiment, the bounding box adjustment system 170 includes a memory 190 that stores the adjustment module 192. The memory 190 is a random-access memory (RAM), read-only memory (ROM), a hard disk drive, a flash memory, or other suitable memory for storing the adjustment module 192. The adjustment module 192 is, for example, computer-readable instructions that, when executed by the processor(s) 110, cause the processor(s) 110 to perform the various functions disclosed herein.

Furthermore, in one embodiment, the bounding box adjustment system 170 includes a data store(s) 180. The data store(s) 180 is, in one embodiment, an electronic data structure such as a database that is stored in the memory 190 or another memory and that is configured with routines that can be executed by the processor(s) 110 for analyzing stored data, providing stored data, organizing stored data, and so on. Thus, in one embodiment, the data store(s) 180 stores data used by the adjustment module 192 in executing various functions. In one embodiment, the data store(s) 180 includes point cloud data 182 and/or bounding box data 184, along with, for example, other information that is used by the adjustment module 192.

The point cloud data 182 may include one or more point clouds. Generally, a point cloud is a data structure that includes a set of data points in space. The points may represent a two-dimensional and/or three-dimensional shape or object. Each point position may have a set of coordinates indicating its location.

The one or more point clouds making up point cloud data 182 may have been generated from information from one or more sensors. For example, the point cloud data 182 could include one or more point clouds generated by the LIDAR sensor(s) 124 of the sensor system 120 of FIG. 1. Moreover, the LIDAR sensor(s) 124 targets an object with a laser and measures the time for the reflected light to return to the receiver. Using these measurements, points representing reflections from the surface of an object can be constructed in a point cloud, wherein each point provides a location that represents the surface of the object.

However, the one or more point clouds making of the point cloud data 182 may also be generated in other ways as well. For example, instead of utilizing the LIDAR sensor(s) 124, point clouds can be constructed utilizing image information captured from one or more camera sensor(s) 126 of FIG. 1. These types of point clouds are sometimes referred to as pseudo-LIDAR point clouds and are generated by first creating a depth map of the image and then back projecting the depth map into a three-dimensional space to generate the pseudo-LIDAR point cloud.

Regarding the bounding box data 184, this data can include information regarding bounding boxes that were generated using the point cloud data 182. As previously mentioned, bounding boxes are used to describe the spatial location of an object. Generally, the bounding boxes may be rectangular and outline the location of an object in a two-dimensional or three-dimensional space. The bounding box may also include additional information regarding the type of object and a confidence rating indicating how likely the bounding box correctly describes the spatial location of the object.

The bounding boxes of the bounding box data 184 are based on the point cloud data 182. An object detection system 175 receives, as an input, the point cloud data 182. From there, the object detection system 175 outputs one or more bounding boxes of one or more detected objects that were detected within the point cloud data 182.

As mentioned before, bounding boxes output by the object detection system 175 may not properly outline and spatially define the object detected in the point cloud data 182. Accordingly, the adjustment module 192 includes instructions that function to adjust one or more dimensions of the bounding boxes, so they more accurately reflect and spatially define the object detected in the point cloud data 182.

Figure 3:
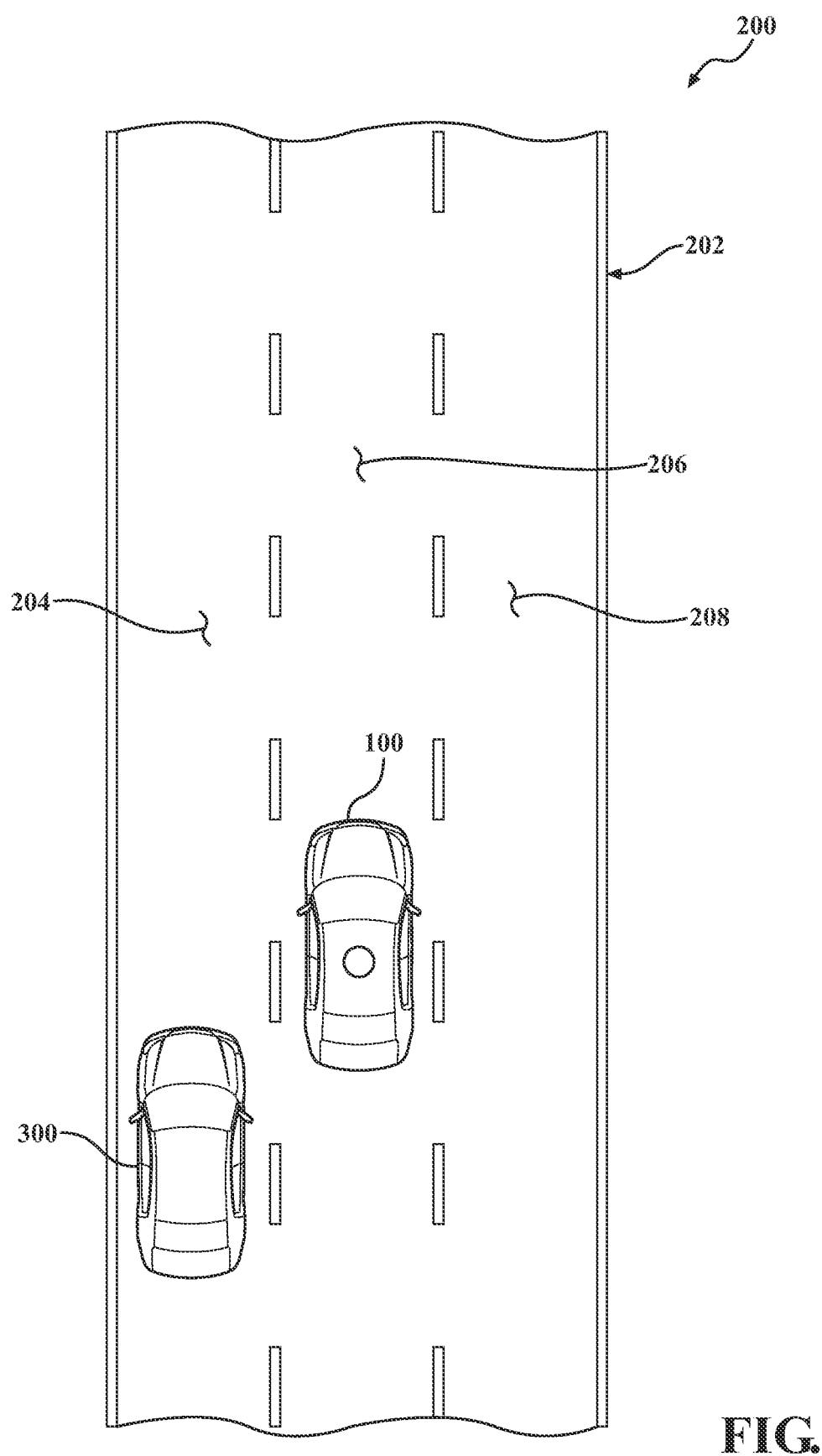
FIG. 3 illustrates a scenario of a vehicle incorporating the bounding box adjustment system traveling on a road nearby another vehicle.

In order to better understand how this occurs, reference is made to FIG. 3, which illustrates a scenario 200 that involves the vehicle 100 of FIG. 1 that incorporates the bounding box adjustment system 170 of FIG. 2. It should be understood that the scenario 200 is one example of a scenario that may benefit from the bounding box adjustment system 170. In this scenario 200, the vehicle 100 is traveling in an environment that includes a road 202 with lanes 204, 206, and 208. Generally, the lane 204 is the leftmost lane, the lane 206 is the middle lane, and the lane 208 is the right lane. The vehicle 100, which incorporates the bounding box adjustment system 170, is traveling in the center lane 206. Located in the left lane 204 is another vehicle 300.

The vehicle 100, in this example, is equipped with one or more the LIDAR sensor(s) 124 that are capable of generating point clouds that can be later used by the object detection system 175 to detect one or more objects within the point cloud generated by the LIDAR sensor(s) 124. In this example, the LIDAR sensor(s) 124 output data that may be stored within the data store(s) 180 as the point cloud data 182, which is then utilized by the object detection system 175 to generate bounding boxes of detected objects which are stored in the data store(s) 180 as the bounding box data 184. Again, as mentioned previously, the point clouds can be generated by other types of sensors, such as the camera sensor(s) 126, and are not restricted to being generated by the LIDAR sensor(s) 124.

Figure 4A:
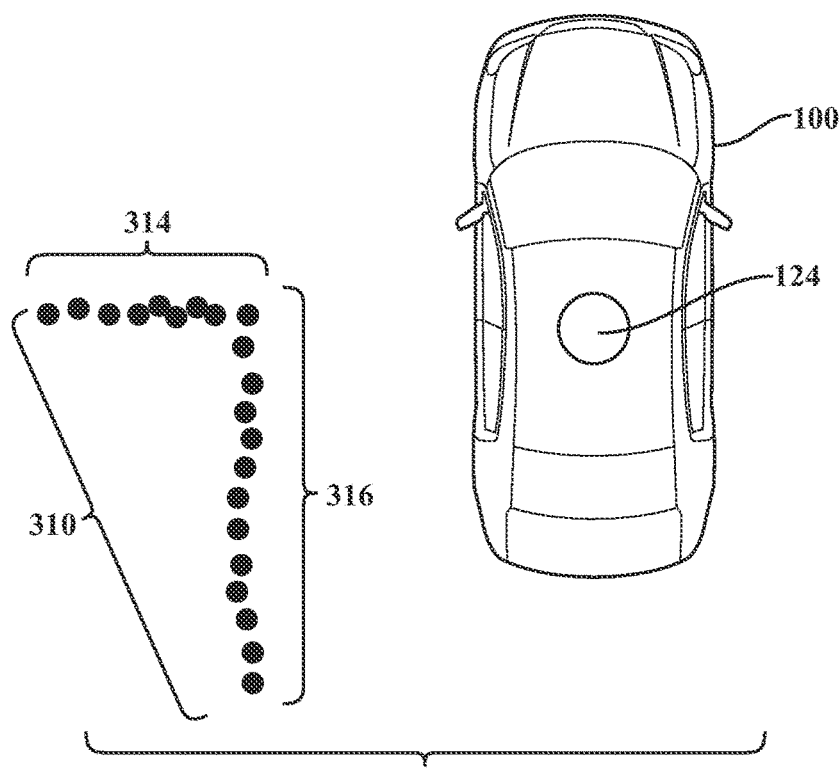
FIGS. 4A and 4B illustrate a point cloud and bounding box, respectively, of the nearby vehicle in the scenario of FIG. 3.

As shown in FIG. 4A, the LIDAR sensor(s) 124 output data that can be used to generate a point cloud 310 that includes a series of points that represent reflections from the surface of the vehicle 300. In this example, the point cloud 310 includes a row 314 of points that generally represent the front surface of the vehicle 300 and another row 316 that represents the right side surface of the vehicle 300. It is worth mentioning that the point cloud 310 does not include points that represent the left side or rear side of the vehicle 300. This is because the LIDAR sensor(s) 124 can only receive reflections from surfaces that are within the line of sight of the LIDAR sensor(s) 124. In this example, the left side and rear side of the vehicle 300 are obscured by the front side and right side of the vehicle 300.

Figure 4B:
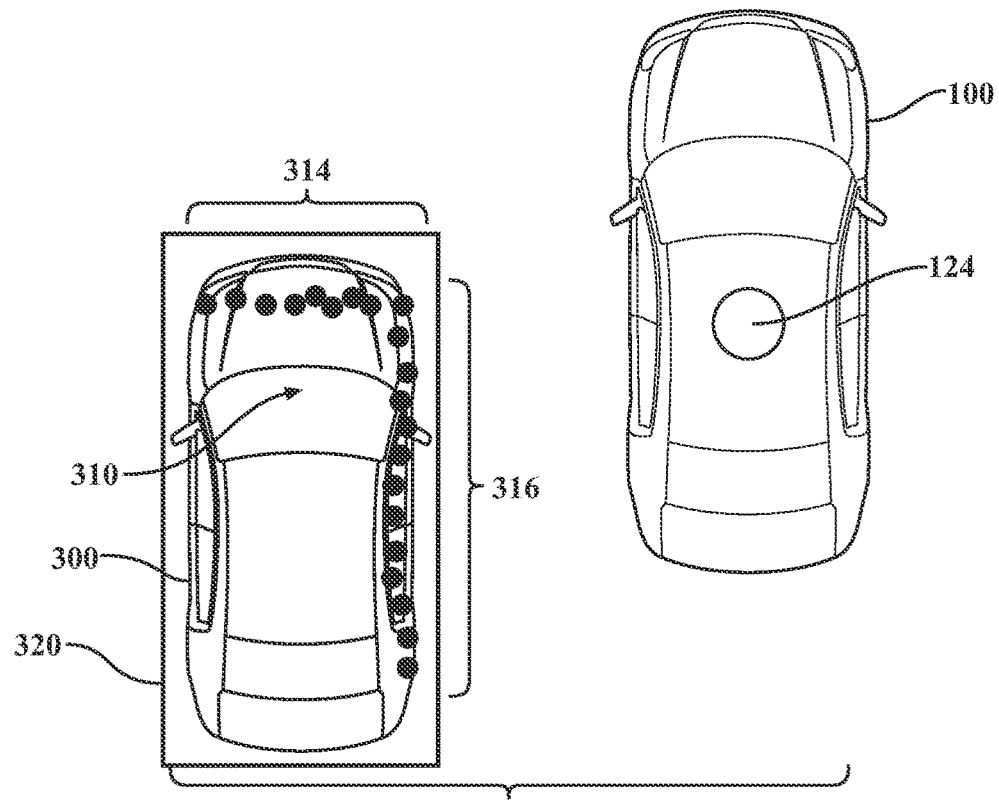

Referring to FIG. 4B, the object detection system 175 and/or the bounding box adjustment system 170 utilizes the point cloud 310 to generate a bounding box 320 that generally outlines an object, in this case, the vehicle 300. In this example, the bounding box 320 includes sides 330, 332, 334, and 336. However, it is worth noting that the bounding box 320 does not precisely outline the vehicle 300. In this example, the bounding box 320 is generally larger than the vehicle 300. However, in other examples, it may be possible that the bounding box 320 may be smaller than the vehicle 300. As will be further explained, the bounding box adjustment system 170 can adjust the size of the bounding box 320, so it more precisely outlines the vehicle 300.

Figure 5:
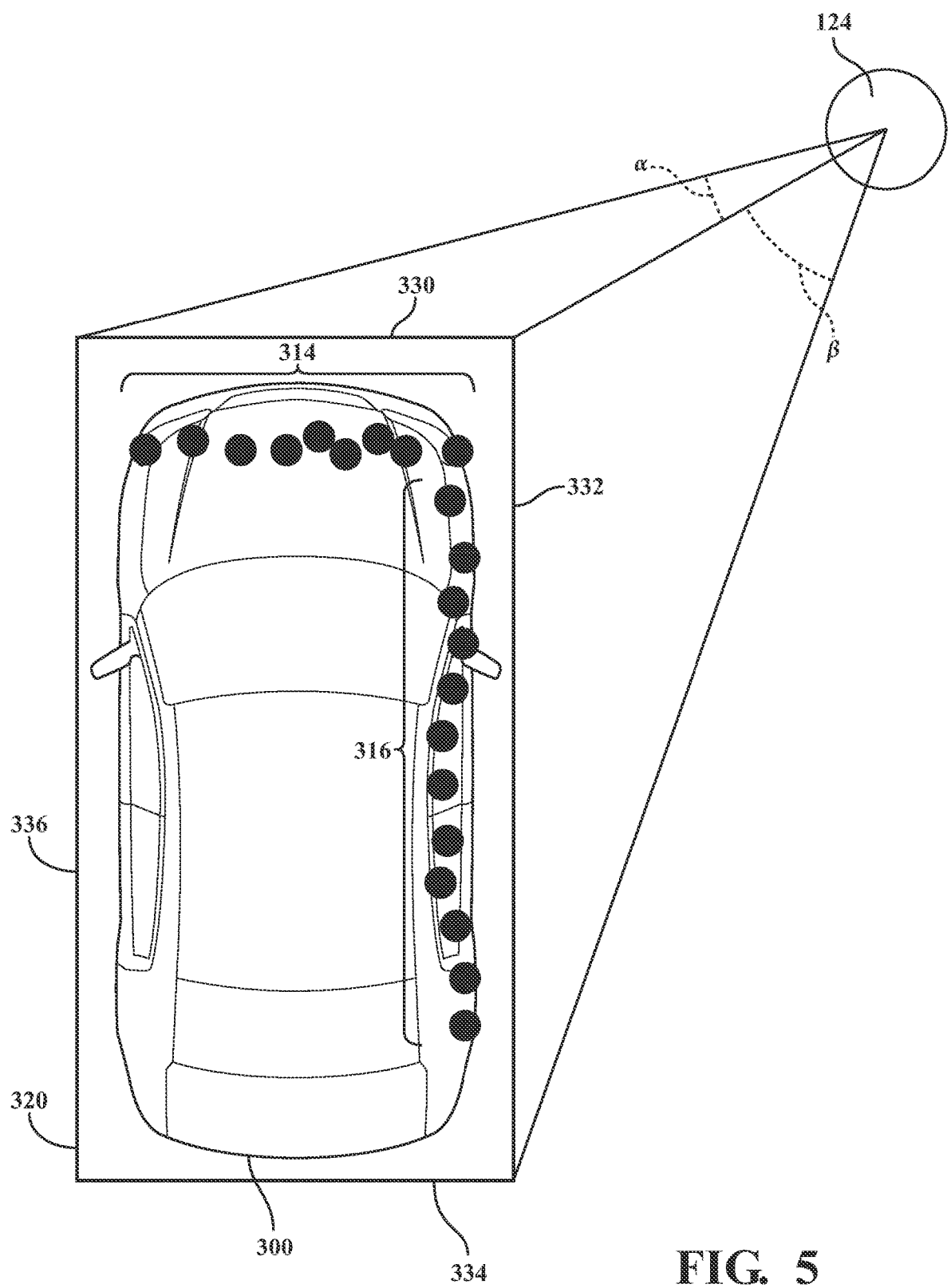
FIG. 5 illustrates a more detailed view of the point cloud and bounding box of FIG. 4 and the viewing angle of a sensor with respect to two different sides of the bounding box.

Moreover, referring to FIG. 5, the adjustment module 192 causes the processor(s) 110 to determine a viewing angle of one or more sides of the bounding box 320. In this particular example, the adjustment module 192 causes the processor(s) 110 to determine the relative viewing angle of the LIDAR sensor(s) 124 with respect to the sides 330 and 332 of the bounding box 320. It is noted that the LIDAR sensor(s) 124 cannot detect or physically view the bounding box 320, as the bounding box 320 is merely an electronic representation of the object in a virtual two-dimensional or three-dimensional space. As such, it should be understood that the viewing angle of the LIDAR sensor(s) 124 with respect to the sides 330 and 332 of the bounding box 320 is a virtual viewing angle. In one example, the adjustment module 192 causes the processor(s) 110 to locate the LIDAR sensor(s) 124 in a virtual space that includes the bounding boxes. Using the virtual location of the LIDAR sensor(s) 124, a viewing angle, which is essentially a virtual viewing angle, of the LIDAR sensor(s) 124 with respect to the sides 330 and 332 of the bounding box 320 can be determined.

Here, the viewing angle of the LIDAR sensor(s) 124 with respect to the side 330, which represents the front of the vehicle 300, is represented by angle $\alpha$. In contrast, the viewing angle of the LIDAR sensor(s) 124 with respect to the side 332, which represents the right side of the vehicle 300, is represented by the angle $\beta$. In this particular example, the magnitude of the angle $\beta$ is greater than the magnitude of the angle $\alpha$. Generally, the greater the viewing angle, the better the view that the LIDAR sensor(s) 124 had of a particular side of an object. In this case, the LIDAR sensor(s) 124 had a better view of the right side of the vehicle 300 than that of the front side of the vehicle 300.

As mentioned before, the adjustment module 192 causes the processor(s) 110 to adjust one or more dimensions of the bounding box 320 so that it more accurately spatially defines the vehicle 300 based on the magnitude of the viewing angle. In one example, the adjustment module 192 causes the processor(s) 110 to adjust one or more dimensions of the bounding box 320 such that a side, such as sides 330 and/or 332, of the bounding box 320 moves closer to points of the point cloud 310 used to generate the bounding box 320 based on the magnitude of the viewing angle of the side of the bounding box 320 with respect to the LIDAR sensor(s) 124.

Figure 6:
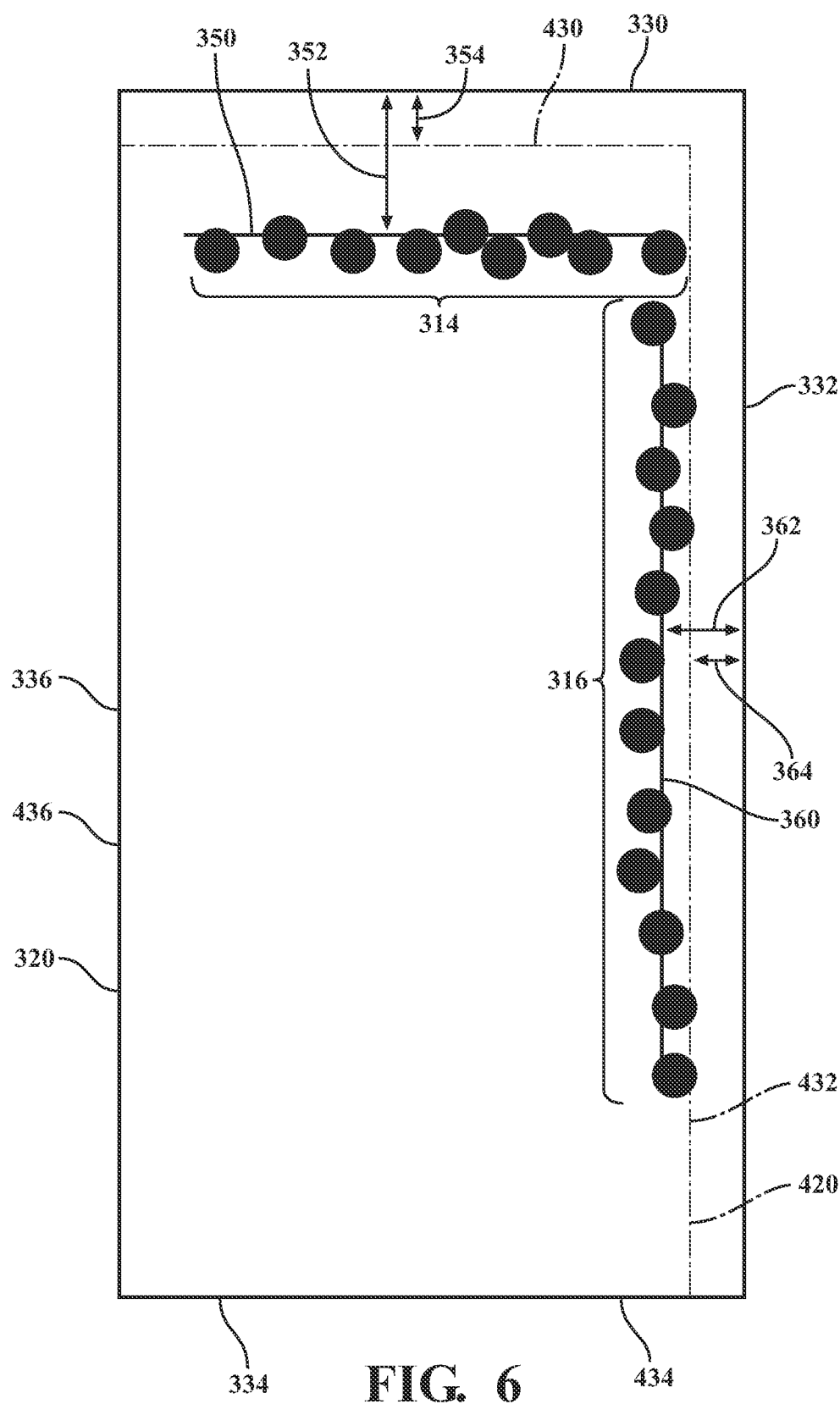
FIG. 6 illustrates both the bounding box of FIG. 5 and an adjusted bounding box that the bounding box adjustment system has adjusted.

Referring to FIG. 6, a visualization indicating how this occurs is illustrated. Moreover, as mentioned before, the point cloud 310 includes a row 314 of points representing the front of the vehicle 300 and a row 316 of points representing the side of the vehicle 300. In this example, a distance 352 between the side 330 of the bounding box 320 and the row 314 of the points of the point cloud 310 is determined. The distance 352 may be determined by the average distance, perpendicular to the side 330, of each of the points making up the row 314. This averaging of the points making up the row 314 is represented by line 350. In this example, the distance 352 is the distance between the line 350 and the side 330. Of course, other methodologies for determining the distance 352 may also be utilized. For example, one of the points making up the row 314 could be chosen at random to be used to determine the distance 352 between the randomly chosen point and the side 330.

In like manner, the same occurs with the points making up the row 316, which represents the right side of the vehicle 300. Here, a distance 362 is determined between the line 360 and the side 332. Like before, the line 360 may be determined by averaging the general location of the points making up the row 316 in a direction perpendicular to the side 330. The distance 362 is the distance between the line 360 and the side 332.

The adjustment module 192 causes the processor(s) 110 to determine confidence factors based on the viewing angles of the sides 330 and 332 of the bounding box 320 with respect to the LIDAR sensor(s) 124. As previously mentioned when describing FIG. 5, the viewing angle of the side 330 with respect to the LIDAR sensor(s) 124 is represented as angle $\alpha$, and the viewing angle of the side 332 with respect to the LIDAR sensor(s) 124 is represented as angle $\beta$. The confidence factors are generally related to and may be proportional to the magnitudes of the angles $\alpha$ and $\beta$. Generally, the greater the viewing angle, the greater the confidence factor. In some cases, the confidence factor may be scaled between 0 and 1, wherein 0 indicates low confidence and 1 indicates high confidence. In one example, viewing angles less than 5° are given a confidence factor of 0, and viewing angles equal to or greater than 120° will be given a confidence factor of 1. Viewing angles between 5° and 120° will be scaled between 0 and 1. Of course, it should be understood that scaling can vary from application to application.

Using this confidence factor, the adjustment module 192 causes the processor(s) 110 to adjust the dimensions of the bounding box 320 such that one or more sides, such as the sides 330 and 332, are moved closer to the rows 314 and 316 of points, respectively. In this example, the confidence factor of the side 330 is lower than the confidence factor of the side 332, as the viewing angle $\alpha$ of the side 330 is less than the viewing angle $\beta$ of the side 332.

In this case, the adjustment module 192 causes the processor(s) 110 to move the side 330 closer to the row 314 of points by a distance 354. In like manner, the adjustment module 192 causes the processor(s) 110 to move the side 332 closer to the row 316 of points by a distance 364. In this case, the distance 354 may be determined by multiplying the confidence factor based on the viewing angle $\alpha$ by the distance 352. In like manner, the distance 364 may be determined by multiplying the confidence factor based on the viewing angle $\beta$ by the distance 362.

By moving the sides 330 and 332 to the rows 314 and 316 of the points, respectively, the dimensions of the bounding box 320 are adjusted to yield a bounding box 420 that has sides 430, 432, 434, and 436 that more accurately match the spatial dimensions of the vehicle 300. By adjusting one or more dimensions of bounding boxes to create more spatially accurate bounding boxes, downstream processes that rely on the accurate detection of objects can make better decisions.

Figure 7:
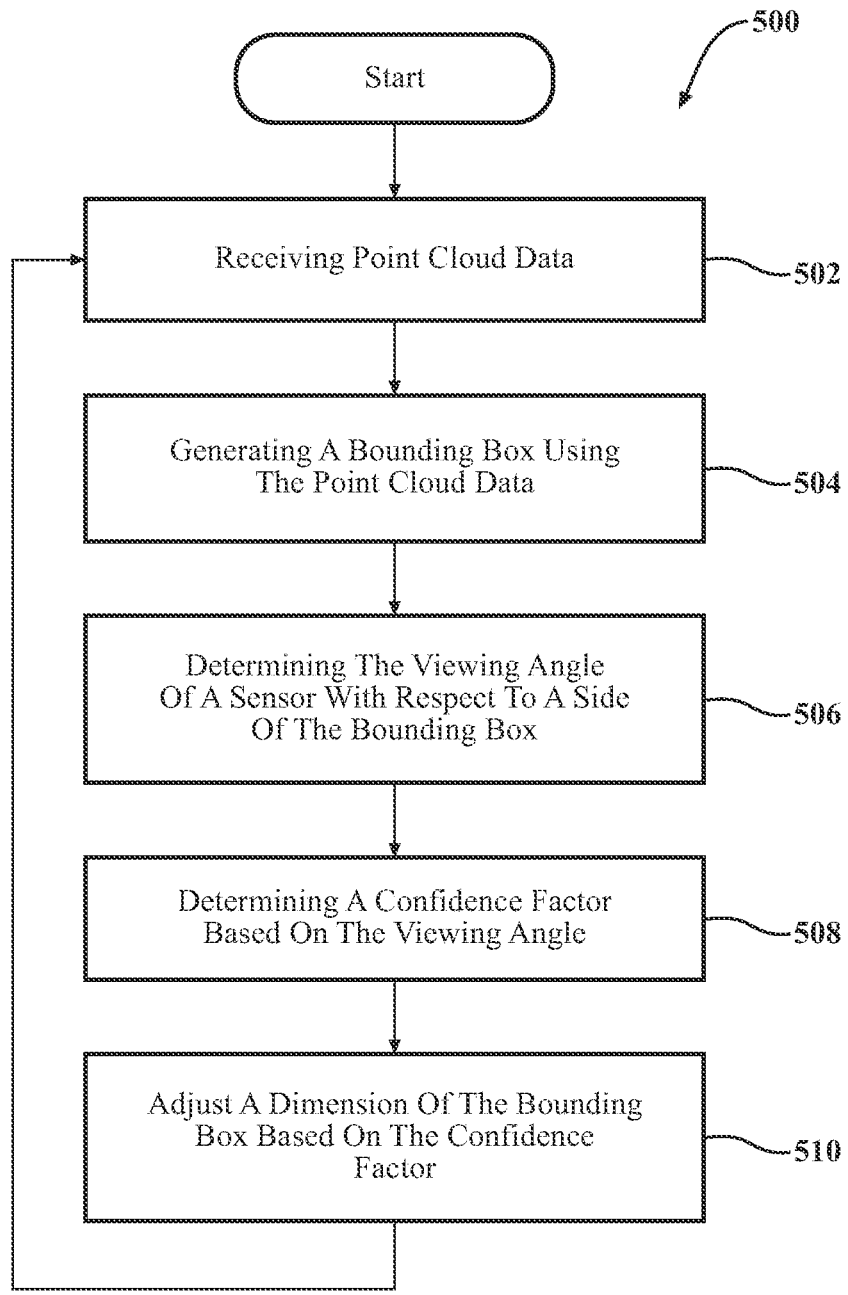
FIG. 7 illustrates a method for adjusting one or more dimensions of a bounding box based on the sensor's viewing angle with respect to the bounding box.

Referring to FIG. 7, a method 500 for adjusting one or more dimensions of a bounding box is shown. The method 500 will be described from the viewpoint of the vehicle 100 of FIG. 1 and the bounding box adjustment system 170 of FIG. 2. However, it should be understood that this is just one example of implementing the method 500. While method 500 is discussed in combination with the bounding box adjustment system 170, it should be appreciated that the method 500 is not limited to being implemented within the bounding box adjustment system 170, but is instead one example of a system that may implement the method 500.

In step 502, the processor(s) 110 is configured to receive point cloud data, such as the point cloud data 182. As explained previously, the point cloud data 182 may be LIDAR-based point cloud data generated by the LIDAR sensor(s) 124. However, it should be equally understood that the point cloud data 182 may be point cloud is generated from other sensors, such as pseudo-LIDAR point clouds that may be generated using one or more images captured from a camera sensor(s) 126.

In step 504, the processor(s) 110 is configured to generate one or more bounding boxes using the point cloud data 182. In one example, an object detection system 175 receives, as an input, the point cloud data 182. From there, the object detection system 175 outputs one or more bounding boxes of one or more detected objects that were detected within the point cloud data 182. Generally, the bounding boxes may be rectangular and generally outline the location of an object in a two-dimensional or three-dimensional space. The bounding box may also include additional information regarding the type of object and a confidence rating indicating how likely the bounding box correctly describes the spatial location of the object.

In step 506, the adjustment module 192 causes the processor(s) 110 to determine the viewing angle of the sensor utilized to generate the point cloud data with respect to a side of the bounding box. In one example, the adjustment module 192 causes the processor(s) 110 to locate the LIDAR sensor(s) 124 in a virtual space that includes the bounding boxes. Using the virtual location of the LIDAR sensor(s) 124, a viewing angle, which is essentially a virtual viewing angle, of the LIDAR sensor(s) 124 with respect to the sides 330 and 332 of the bounding box 320 can be determined. For example, as best shown in FIG. 5, the adjustment module 192 causes the processor(s) 110 to determine the viewing angle of the LIDAR sensor(s) 124 with respect to the sides 330 and 332 of the bounding box 320. Here, the viewing angle of the LIDAR sensor(s) 124 with respect to the side 330, which represents the front of the vehicle 300, is represented by angle $\alpha$. In contrast, the viewing angle of the LIDAR sensor(s) 124 with respect to the side 332, which represents the right side of the vehicle 300, is represented by the angle $\beta$.

In step 508, the adjustment module 192 causes the processor(s) 110 to determine the confidence factor based on the viewing angle. Generally, the greater the viewing angle, the greater the confidence factor. In some cases, the confidence factor may be scaled between 0 and 1, wherein 0 indicates low confidence and 1 indicates high confidence. In one example, viewing angles less than 5° are given a confidence factor of 0, and viewing angles equal to or greater than 120° will be given a confidence factor of 1. Viewing angles between 5° and 120° will be scaled between 0 and 1. Of course, it should be understood that scaling can vary from application to application.

In step 510, the adjustment module 192 causes the processor(s) 110 to adjust one or more dimensions of the bounding box based on the confidence factor. Moreover, the adjustment module 192 causes the processor(s) 110 to adjust the dimensions of the bounding box such that one or more sides are moved closer to the points of the point cloud that was utilized to generate the bounding box. As previously explained, a distance between a side of a bounding box and one or more points near the side of the bounding box can be multiplied by the confidence factor to yield an adjustment distance. This adjustment distance can then be utilized as the distance to adjust the dimensions of the bounding box. Moreover, in one example, the distance between the side of the bounding box in one or more points near the side of the bounding box can be reduced by the adjustment distance such that the side of the bounding box moves closer to the points utilized to generate the bounding box. After step 510 is completed, the method 500 may end or may begin again and return to step 502.

As such, the systems and methods described herein for adjusting one or more dimensions of a bounding box can be used to adjust bounding boxes so that they are more spatially accurate with respect to the object that they represent. This is advantageous because downstream applications, such as motion planning, can utilize these more accurate representations to determine more appropriate actions.

FIG. 1 will now be discussed as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route. Such semi-autonomous operation can include supervisory control as implemented by autonomous driving system 160 to ensure the vehicle 100 remains within defined state constraints.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use. The term "operatively connected," as used throughout this description, can include direct or indirect connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other associated data. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensor(s) 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensor(s) 124, one or more sonar sensors 125, and/or one or more camera sensor(s) 126. In one or more arrangements, the one or more camera sensor(s) 126 can be high dynamic range (HDR) cameras or infrared (IR) cameras.

The vehicle 100 can include an input system 130. An "input system" includes any device, component, system, element or arrangement, or groups that enable information/data to be entered into a machine. The input system 130 can receive an input from a vehicle passenger (e.g., a driver or a passenger). The vehicle 100 can include an output system 135. An "output system" includes any device, component, arrangement, or groups that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 140 or components thereof to respond to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product that comprises all the features enabling the implementation of the methods described herein and, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™. Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. As used herein, the term "plurality" is defined as two or more than two. The term "another," as used herein, is defined as at least a second or more. The terms "including" and/or "having." as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system comprising:
a processor; and
a memory in communication with the processor, the memory storing an adjustment module having instructions that, when executed by the processor, cause the processor to:
generate a bounding box using a point cloud generated by a sensor, the bounding box representing an object,
determine a confidence factor based on a magnitude of a viewing angle of a side of the bounding box with respect to the sensor, and
adjust a dimension of the bounding box such that the side of the bounding box moves closer to the one or more points of the point cloud that correspond to the side of the bounding box by an adjustment distance, the adjustment distance being based on the confidence factor and is proportional to the confidence factor.

2. The system of claim 1, wherein the adjustment module further includes instructions that, when executed by the processor, cause the processor to adjust the dimension of the bounding box such that the side of the bounding box moves closer to points of the point cloud used to generate the bounding box based on the magnitude of the viewing angle of the side of the bounding box with respect to the sensor.

3. The system of claim 1, wherein the confidence factor is proportional to the magnitude of the viewing angle.

4. The system of claim 1, wherein the sensor is a LIDAR sensor and the point cloud is a LIDAR point cloud.

5. The system of claim 1, wherein the sensor is a camera sensor and the point cloud is a pseudo-LIDAR point cloud.

6. The system of claim 1, wherein the sensor is mounted to a vehicle.

7. A method comprising steps of:
generating a bounding box using a point cloud generated by a sensor, the bounding box representing an object;
determining a confidence factor based on a magnitude of a viewing angle of a side of the bounding box with respect to the sensor; and
adjusting a dimension of the bounding box such that the side of the bounding box moves closer to the one or more points of the point cloud that correspond to the side of the bounding box by an adjustment distance, the adjustment distance being based on the confidence factor and is proportional to the confidence factor.

8. The method of claim 7, further comprising the step of adjusting the dimension of the bounding box such that the side of the bounding box moves closer to points of the point cloud used to generate the bounding box based on the magnitude of the viewing angle of the side of the bounding box with respect to the sensor.

9. The method of claim 7, wherein the confidence factor is proportional to the magnitude of the viewing angle.

10. The method of claim 7, wherein the sensor is a LIDAR sensor and the point cloud is a LIDAR point cloud.

11. The method of claim 7, wherein the sensor is a camera sensor and the point cloud is a pseudo-LIDAR point cloud.

12. The method of claim 7, wherein the sensor is mounted to a vehicle.

13. A non-transitory computer-readable medium storing instructions that, when executed by a processor, cause the processor to
generate a bounding box using a point cloud generated by a sensor, the bounding box representing an object;

determine a confidence factor based on a magnitude of a viewing angle of a side of the bounding box with respect to the sensor; and adjust a dimension of the bounding box such that the side of the bounding box moves closer to the one or more points of the point cloud that correspond to the side of the bounding box by an adjustment distance, the adjustment distance being based on the confidence factor and is proportional to the confidence factor.

14. The non-transitory computer-readable medium of claim 13, further storing instructions that, when executed by the processor, cause the processor to adjust the dimension of the bounding box such that the side of the bounding box moves closer to points of the point cloud used to generate the bounding box based on the magnitude of the viewing angle of the side of the bounding box with respect to the sensor.

15. The non-transitory computer-readable medium of claim 13, wherein the confidence factor is proportional to the magnitude of the viewing angle.

16. The non-transitory computer-readable medium of claim 13, wherein the sensor is a LIDAR sensor and the point cloud is a LIDAR point cloud.

17. The non-transitory computer-readable medium of claim 13, wherein the sensor is a camera sensor and the point cloud is a pseudo-LIDAR point cloud.

* * * * *